Dec. 28, 1954     K. C. JENNE     2,698,151
AERIAL CABLE SUSPENSION CLAMP
Filed Feb. 3, 1950     2 Sheets-Sheet 1
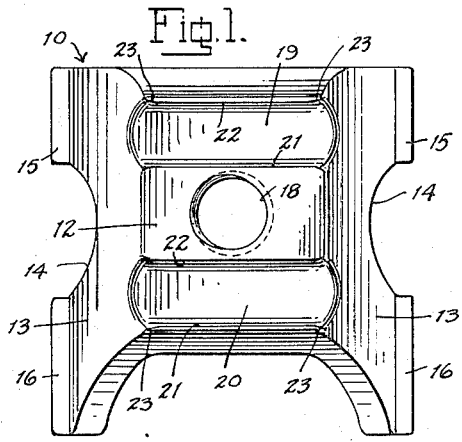
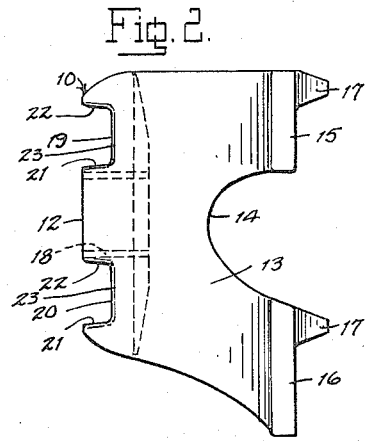
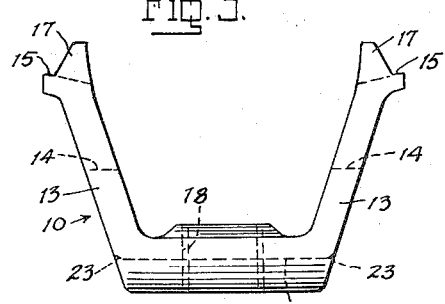
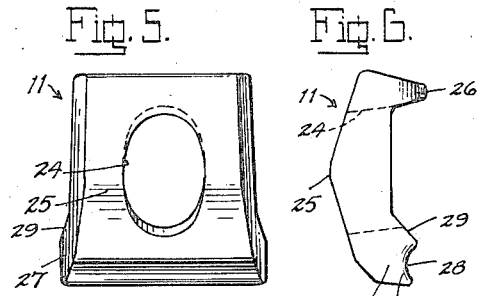
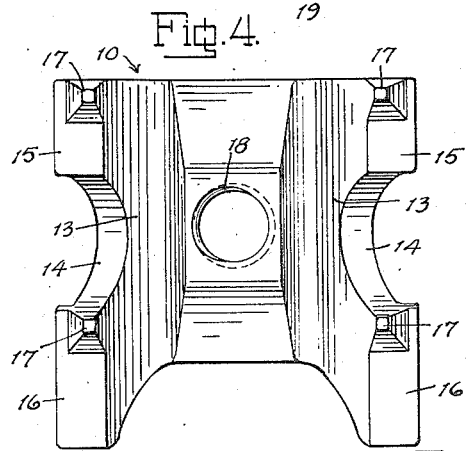
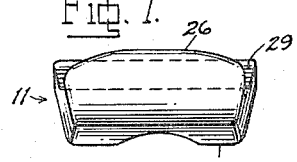
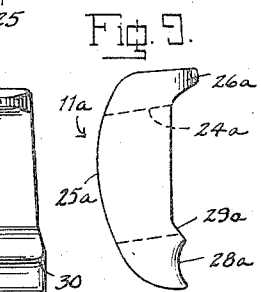
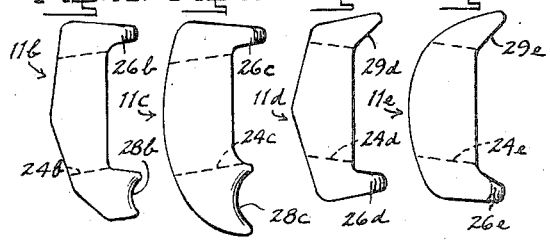
Inventor
KENNETH C. JENNE.
By
Attorney Dec. 28, 1954 K. C. JENNE 2,698,151
AERIAL CABLE SUSPENSION CLAMP
Filed Feb. 3, 1950 2 Sheets-Sheet 2
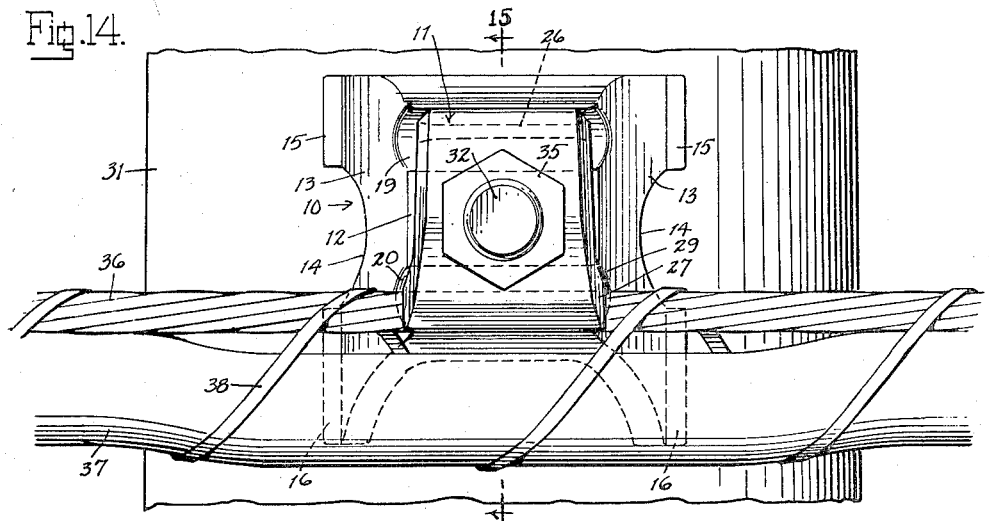
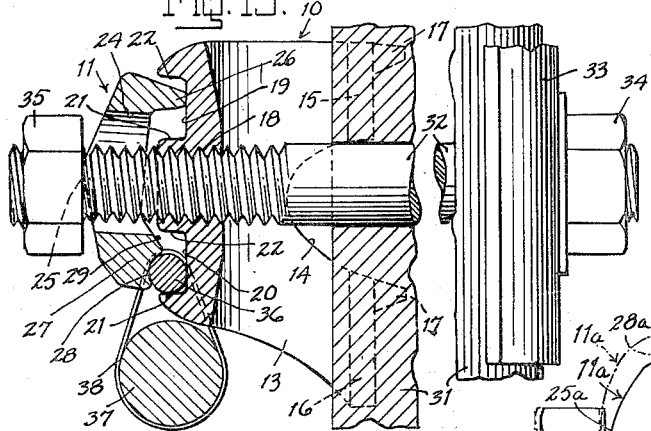
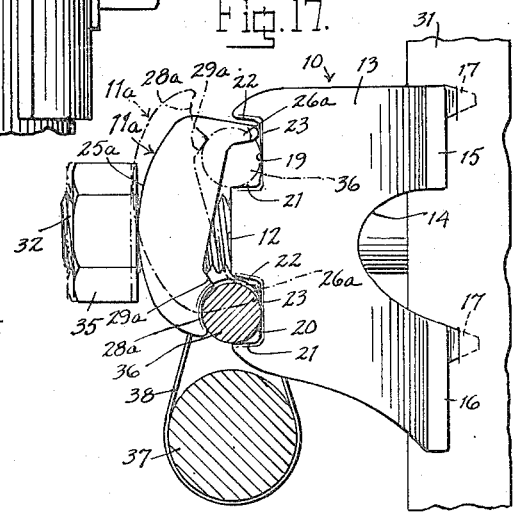
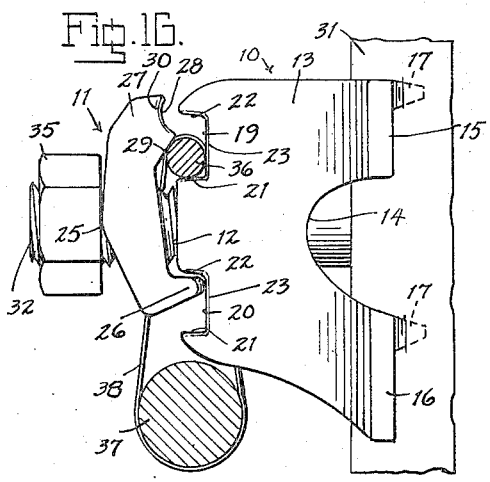
Inventor
KENNETH C. JENNE.
By
Attorney

United States Patent Office 2,698,151
Patented Dec. 28, 1954

2,698,151

AERIAL CABLE SUSPENSION CLAMP

Kenneth C. Jenne, Branford, Conn., assignor to Malleable Iron Fittings Company, Branford, Conn., a corporation of Connecticut Application February 3, 1950, Serial No. 142,325

1 Claim. (Cl. 248—67.5)

The present invention relates to an aerial cable suspension clamp for attachment to transmission line poles, and particularly for use with self-supporting pre-assembled or field assembled aerial cable installations, wherein the cable messenger is connected to the cable by a lashing wire or tape wound about the cable messenger and the cable. An object of the invention is to provide a clamp of this character which provides for adequate spacing of the cable from the pole and for a choice of placing the messenger either above or below the through-bolt by means of which the clamp is connected to the pole. In the preferred embodiment of the invention the messenger will be supported at least two inches from the face of the pole, although this distance may be varied to suit particular requirements.

A further object is to provide a clamp in which supporting grooves are provided above and below the through-bolt, these grooves being of identical shape and dimension and each adapted to receive either the messenger or the fulcrum end of the clamping plate, depending upon whether the messenger is installed above or below the through-bolt. It is further proposed to provide grooves each having a shelf support for the messenger so that the weight of the cable is taken directly by the body of the clamp, the clamping plate acting only to provide the necessary clamping effect, thus eliminating the possibility of the messenger wedging itself between the body and the clamping plate. It is further proposed to provide groove formations each having a relatively wide surface upon which the fulcrum end of the clamping plate is engaged for relative tilting and vertical movement so as to enable the clamping plate to adapt its position to messengers of different diameters.

A further object is to provide a clamp in which the through-bolt for connecting the clamp to the pole also serves as the clamping bolt for the clamping plate, and to this end the clamp body has the through-bolt secured therein and projecting therefrom to receive the clamping plate and the clamping nut. This construction assures maintenance of the relative position of the clamp body and clamping plate even if shrinkage occurs in the pole.

Another object is to provide a clamp which when the messenger is placed below the through-bolt will enable the clamping of the messenger in many cases, without cutting the lashing wire or tape. In every case, if the wire or tape must be cut, the distance to which it must be cut back on either side of the clamp is greatly minimized.

With the above and other objects in view an embodiment of the invention is shown in the accompanying drawings, and this embodiment will be hereinafter more fully described with reference thereto, and the invention will be finally pointed out in the claim.

In the drawings:

Fig. 1 is a front elevation of the clamp body of the aerial cable messenger clamp according to the illustrated exemplary embodiment of the invention.

Fig. 2 is a side elevation.

Fig. 3 is a top plan view.

Fig. 4 is a rear elevation.

Fig. 5 is a front elevation of the clamping plate.

Fig. 6 is a side elevation thereof.

Fig. 7 is a top plan view.

Fig. 8 is a rear elevation.

Fig. 9 is a side elevation of a modified form of clamping plate adapted for engagement with a messenger having a range of sizes larger than the range of sizes adapted to be engaged by the clamping plate shown in Figs. 5 to 8.

Figs. 10 to 13 are side elevations of further modified forms of clamping plates.

Fig. 14 is a front elevation of the clamp mounted upon a pole, and showing the messenger clamped in the groove below the through-bolt.

Fig. 15 is a vertical sectional view taken along the line 15—15 of Fig. 14.

Fig. 16 is a side elevation showing the clamp with the messenger engaged in the groove above the through-bolt.

Fig. 17 is a side elevation showing the modified form of clamping plate illustrated in Fig. 9 in clamping relation with a messenger engaged in the groove below the through-bolt, the dot-and-dash lines also showing the messenger engaged in the groove above the through-bolt.

Referring to the drawings the aerial cable suspension clamp for attachment to transmission line poles, according to the illustrated exemplary embodiment of the invention shown therein, comprises a pole-engaging clamp body 10, shown in detail in Figs. 1 to 4, and a clamping plate 11, shown in detail in Figs. 5 to 8, the clamping plate being adapted for connection to the clamping body by means of the through-bolt connecting the clamp body to the pole, as will presently more fully appear. The clamp body and the clamping plate are preferably in the form of malleable iron castings, although it will be understood that the invention is not limited to this type of structure and material.

The clamp body 10 is provided with a forwardly disposed face portion 12 adapted to be outwardly spaced from the pole upon which the bracket is supported by a pair of outwardly splayed side leg portions 13—13, each having an arched recess 14 intermediate its upper and lower edges and each provided with an upper pole-engaging pad portion 15 and a lower pole-engaging pad portion 16, these pade portions being inclined to substantially conform to the circumference of the pole and each being provided adjacent its upper edge with a projecting spur 17 adapted to dig into the pole. The upper edges of the side leg portions are preferably horizontally disposed, while the lower edges are curved or inclined downwardly and inwardly to the lower edge of the pad portion 16 so that the turning strain upon the clamp is supported against the surface of the pole at a point well below the through-bolt and the point at which the messenger is supported. The lower pad portions 16 are also substantially longer in vertical direction than the upper pad portions 15 so that they have substantially greater surface areas for engagement with the pole. Thus any tendency of the clamp to overturn or slot down the pole is minimized.

Centrally of the forward face 12 of the clamp body there is provided a screw threaded hole 18 for receiving the through bolt, as will presently more fully appear, and above and below the hole 18 there are provided identical horizontally extending parallel messenger receiving grooves 19 and 20. Each of these grooves has a relatively wide vertically disposed flat bottom and at its lower side is provided with a relatively wide messenger supporting shelf 21, constituting the lower wall of the groove. The upper wall 22 of each of the grooves is substantially symmetrical to the lower wall and is adapted to prevent the messenger from being pulled upwardly out of engagement with the groove in the event that upward pull is exerted on the cable, thus also acting as a supporting shelf.

The messenger is adapted when clamped to engage in the lower corner of the groove in contact with the base of the groove and the lower shelf portion 21, the depth of the groove being calculated as at least equal to half the diameter of the largest messenger to be accommodated, and the height of the groove being calculated as at least equal to the diameter of such largest diameter messenger. The end corners 23 of the grooves 19 and 20 are flared and thus permit turns in the cable messenger up to as much as 30° on either side.

The clamping plate 11 is of a length approximately equal to the face 12 of the clamping body, and is provided with a vertically elongated bolt-receiving hole 24 through which the through-bolt may be freely engaged in various positions of angularity and vertical adjustment of the clamping plate relative to the clamp body. The forward face of the clamping plate is slightly arched to that a ridge 25 extends along the longitudinal center line of the bolt hole, thus providing firm contact with the center of the nut in the various positions of the clamping plate. At one end the clamping plate is provided with an inwardly projecting fulcrum flange 26 having a rounded nose for tilting engagement with the base of one or the other of the grooves 19 or 20, depending upon whether the messenger is engaged above or below the through-bolt. The vertical thickness of the flange 26 is substantially less than the height of the groove so that it may have substantial vertical adjustment in the groove, its position in the groove depending upon the particular diameter of the cable messenger.

At the other end of the clamping plate there is provided a projecting longitudinal rib portion 27 having a concave messenger engaging bearing groove 28 and an inclined messenger engaging bearing surface 29 inwardly adjacent the groove 28, the radius of the groove being calculated as substantially corresponding to the radius of the largest messenger to be clamped thereby. Thus with a 3/16 inch radius the messenger diameters may range from the minimum diameter messenger up to 3/8 inch diameter. The ends of the groove 28 are slightly flared, as at 30, so as to allow for the bonds in the cable messenger at each side of the clamp.

While the clamping plate, as shown in Figs. 5 to 8, may operate effectually with larger cable diameters, it is preferred to provide an alternative form of clamping plate 11a, as shown in Fig. 9, for messenger diameters ranging between the largest diameter that may be accommodated by the groove 28 and the largest diameter that may be accommodated by the grooves of the clamp body, for instance, up to 1/2 inch diameter. As shown in Fig. 9 the messenger engaging bearing groove 28a has a radius corresponding to the largest cable to be accommodated and inwardly adjacent the groove 28a there is provided an inclined messenger engaging bearing surface 29a. In this embodiment the outer surface is convexly formed, as at 25a, so as to provide for firm contact of the clamping nut in various positions or angular adjustment of the clamping plate, an elongated bolt-receiving hole 24a is provided through the plate, and a fulcrum flange 26a is provided at one end.

As shown in Figs. 14 and 15 the clamp is mounted upon the pole 31 by a through-bolt 32 extended through the pole, having one threaded end engaged through a washer 33 and secured by a nut 34, while its other threaded end is engaged through the hole 18 of the clamp body and projects beyond the face of the clamp body where it is engaged through the hole 24 of the clamping plate 11 and has a clamping nut 35 secured thereon, the latter bearing upon the outer face of the clamping plate to clamp the latter relatively to the clamp body. The clamp body is secured to the pole by the threaded engagement of the through-bolt therewith, and the tightening of the washer 33 against the pole by the nut 34, so that the clamping action of the clamping plate brought about by tightening of the clamp nut 35 is entirely independent of the securing of the clamp body upon the pole, and therefore this relation will not be disturbed in the case of shrinkage or swelling of the pole.

The messenger 36 is shown as engaged with the lower groove 20 and as being of relatively small diameter occupying a position where its center is well inwardly from the edge of the shelf 21, the lever action of the clamping plate causing the bearing groove 28 engaged with the messenger to exert a downward and inward component of force on the messenger. It will be noted that the fulcrum flange 26 engaged the upper groove 19 at a point near the center of the groove, having shifted vertically to this position as the clamping plate has angularly moved into clamping engagement with the messenger. Thus in the case of a smaller diameter messenger than that shown, the fulcrum point will be further downwardly in the base of the groove, while in the case of a larger diameter it will be further upwardly.

The self-supporting pre-assembled or field assembled type of cable illustrated has the cable 37 connected to the messenger by a lashing wire or tape 38, and when engaged in the lower groove 20 it is possible, in many cases, to support the cable without the necessity of cutting the wire or tape, as the cable may be positioned very close to the messenger. In the installation, as shown in Fig. 16, with the messenger engaged in the upper groove 19 and the clamping plate inverted, the lashing wire or tape would be cut at each side of the clamp to allow the downward spacing of the cable from the messenger, the cut ends being secured by clamps at each side. In this case the through-bolt being disposed beneath the messenger acts also as a safety link to prevent the cable messenger from becoming disengaged from the clamp upon loosening of the clamping plate. In the inverted position of the clamping plate with the messenger engaged upon the shelf 21 of the upper groove the inclined bearing surface 29 engages the upper outer side of the messenger. When the clamping plate is loosened through backing off the nut 35 the fulcrum flange end 26 engages the vertical base surface of the groove 20 at a lower point than that shown in Fig. 16. As the nut is tightened, the inclined bearing surface 29, in engagement with the messenger 36, acts as a cam to cause the clamping plate to shift upwardly, as it swings inwardly, to the point where such shifting movement is stopped by engagement of the rounded fulcrum flange end 26 in the corner between the base of the groove and the upper wall 22. Thereupon, as the nut is further tightened, the lever action of the clamping plate causes the inclined bearing surface 29 to exert a downward and inward component of force on the messenger.

In Fig. 17 there is shown an installation in which a relatively large diameter messenger is clamped in the lower groove 20 by the groove 28a of the alternative clamping plate 11a illustrated in Fig. 9, the dot-and-dash lines showing the messenger engaged in the upper groove 19 and the clamping plate in its inverted clamping position with the inclined bearing surface 29a engaging the messenger.

In certain installations the particular user may at all times desire to support the messenger in the lower groove 20 below the through-bolt, while in other installations the user may at all times desire to support the messenger in the upper groove 19 above the through-bolt. In such cases the alternative forms of clamping plates, as shown in Figs. 10 to 13, may be employed, both for the purpose of economy in material, as well as to insure that the installing crew will always follow the practice of the particular user.

In Fig. 10 the clamping plate 11b is provided with a bolt hole 24b, a fulcrum flange 26b and a small radius messenger engaging groove 28b, but is not provided with the inclined clamping surfaces 29 as in the form of the clamping plate shown in Fig. 6. In Fig. 11 the clamping plate 11c is provided with a bolt hole 24c, a fulcrum flange 26c and a large radius messenger engaging groove 28c, but is not provided with the inclined messenger engaging surface 29a as in the form of clamping plate shown in Fig. 9. The clamping plates of Figs. 10 and 11 are particularly adapted for clamping messengers engaged in the lower groove 20 of the clamp body below the through-bolt.

In Fig. 12 the clamping plate 11d is provided with a bolt hole 24d, a fulcrum flange 26d and an inclined messenger engaging surface 29d, but is not provided with the messenger engaging groove 28 of the form of the clamping plate shown in Fig. 6. In Fig. 13 the clamping plate 11e is provided with a bolt hole 24e, a fulcrum flange 26e and an inclined messenger engaging surface 29e, but is not provided with the messenger engaging groove 28a as in the form of the clamping plate shown in Fig. 9. The clamping plates of Figs. 12 and 13 are particularly adapted for clamping messengers engaged in the upper groove of the clamp body above the through-bolt.

I have illustrated and described preferred and satisfactory embodiments of the invention but it will be obvious that changes will be made therein, within the spirit and scope thereof, as defined in the appended claim.

What is claimed is:

In a pole attachment suspension clamp for a circular cross-section messenger, a clamp body having a substantially vertical pole engaging rearward side and a substantially vertical cable messenger clamping forward side having a substantially centrally disposed bolt receiving portion having a horizontal bolt receiving hole, said clamp body having a pair of grooves, one above and one below said bolt receiving portion, each said groove extending horizontally at right angles to the axis of said hole and including a substantially vertically disposed substantially flat-surfaced base wall adapted to constitute a backing-up surface for a messenger, a lower wall extending forwardly from said base wall and adapted to constitute a supporting ledge for said messenger, and an upper wall extending forwardly from said base wall in vertically spaced opposed relation to said lower wall, clamping bolt means extended forwardly through said hole of said bolt receiving portion, a reversible clamping plate disposed at the forward side of said body comprising an intermediate portion having a vertically extending slot opening engaged by said bolt means for vertical shifting movement of said clamping plate relative to said bolt means, an inwardly projecting fulcrum portion at one end for tilting engagement by reversal in either one of said grooves, and an inwardly projecting messenger engaging portion at its other end for clamping engagement with a messenger supported upon the lower wall of the groove not engaged by said fulcrum portion, the projection of said fulcrum portion being such as to space said intermediate portion of said clamping plate outwardly from said bolt receiving portion of said clamping body and the vertical thickness of said fulcrum portion being substantially less than the vertical spacing between said lower and upper walls of said respective grooves whereby said fulcrum portion has substantial vertical sliding movement with the base wall of the groove engaged thereby to permit said clamping plate to have angular and vertical adjustment to engage at its messenger engaging portion messengers of different diameters disposed in load supporting relation upon the lower wall of the other groove, the forward projection of said lower wall of each said groove being such relatively to the vertical spacing of said upper and lower walls thereof that a circular cross-section messenger engaged in said groove and of a diameter less than said vertical spacing of said upper and lower walls will be engaged and supported by said lower wall along a line coinciding with the lower end of the vertical diametric plane of said messenger and will be engaged and backed-up by said base wall along a line coinciding with the inner end of the horizontal diametric plane of said messenger, the forward projection of said lower wall from said base wall being at least equal to the radius of the maximum diameter messenger engageable in said groove between said upper and lower walls thereof.

References Cited in the file of this patent

UNITED STATES PATENTS

| Number | Name | Date |
|---|---|---|
| 1,699,211 | Rose | Jan. 15, 1929 |
| 1,754,924 | Williams | Apr. 15, 1930 |
| 1,911,334 | Williams | May 30, 1933 |
| 2,334,560 | Kennedy | Nov. 16, 1943 |

FOREIGN PATENTS

| Number | Country | Date |
|---|---|---|
| 180,755 | Switzerland | of 1936 |
| 594,426 | Germany | of 1934 |